United States Patent [19]

Wagener

[11] Patent Number: 5,008,484
[45] Date of Patent: Apr. 16, 1991

[54] ASSEMBLY KIT FOR A BUSBAR SYSTEM

[76] Inventor: Hans Wagener, Rittershäuser Str. 14, 6344 Dietzhölztal-Rittershausen, Fed. Rep. of Germany

[21] Appl. No.: 333,119

[22] Filed: Apr. 4, 1989

[30] Foreign Application Priority Data

Apr. 6, 1988 [DE] Fed. Rep. of Germany ....... 3811459

[51] Int. Cl.$^5$ .............................................. H02G 5/00
[52] U.S. Cl. ................................. 174/68.2; 174/71 B; 174/88 B
[58] Field of Search ................... 174/16.2, 68.2, 70 B, 174/71 R, 71 B, 72 R, 72 B, 72 C, 84 S, 88 B, 88 S, 99 B, 99 E, 100, 129 B, 133 B, 149 B, 171; 361/341, 342, 353, 355, 361, 363, 376, 378; 439/110, 113, 114, 115, 119, 120, 207, 210, 212, 213, 214

[56] References Cited

U.S. PATENT DOCUMENTS

| | | | |
|---|---|---|---|
| 2,673,967 | 3/1954 | Hedgecock | 439/120 |
| 2,979,686 | 4/1961 | Longmire | 174/88 B X |
| 3,280,245 | 10/1966 | Rodeseike | 174/171 X |

FOREIGN PATENT DOCUMENTS

| | | | |
|---|---|---|---|
| 7435327 | 1/1975 | Fed. Rep. of Germany . | |
| 3143518 | 5/1983 | Fed. Rep. of Germany | 174/68.2 |
| 3312478 | 10/1984 | Fed. Rep. of Germany | 174/72 B |
| 3616662 | 11/1987 | Fed. Rep. of Germany | 174/88 B |
| 3642517 | 3/1988 | Fed. Rep. of Germany | 439/120 |
| 2432756 | 2/1980 | France | 174/99 B |
| 394199 | 6/1933 | United Kingdom | 439/110 |
| 594896 | 11/1947 | United Kingdom | 174/129 B |

OTHER PUBLICATIONS

Firmendruckschrift "L-System 250", May 1961, 20 pages.
Firmendruckschrift "Schienenverteiler 8 PL aus Isolierstoff, schutzisoliert"der Firma Siemens AG, May 1974, 12 pages.

Primary Examiner—Laramie E. Askin
Attorney, Agent, or Firm—Malcolm B. Wittenberg

[57] ABSTRACT

An assembly kit for a busbar system made of holders and of busbar sections that can be fixed in position or are fixed in position in receptacles of the holders, which receptacles are spaced from and parallel to one another. An extension of the busbar system in two directions running perpendicularly to one another while completely covering the busbar sections on the side facing the mounting surface is achieved by an assembly kit of the following elements:

(a) holders of a first type composed of rectangular carrier plates with their longitudinal dimensions aligned in the longitudinal direction of busbar sections which are fixed in position in receptacles in their tops and which terminate flush with their narrow sides;

(b) holders of a second type consisting of right-angled carrier plates in which right-angled busbar sections are fixed in position in receptacles thereof that terminate flush with the end faces thereof, the end faces being located perpendicularly to the busbar sections; and (c) connecting elements with which abutting ends of busbar sections can be connected to one another so as to conduct electrically in the area of the joints of the carrier places constituting the holders of the first type and/or of the second type connected together in a row.

13 Claims, 3 Drawing Sheets

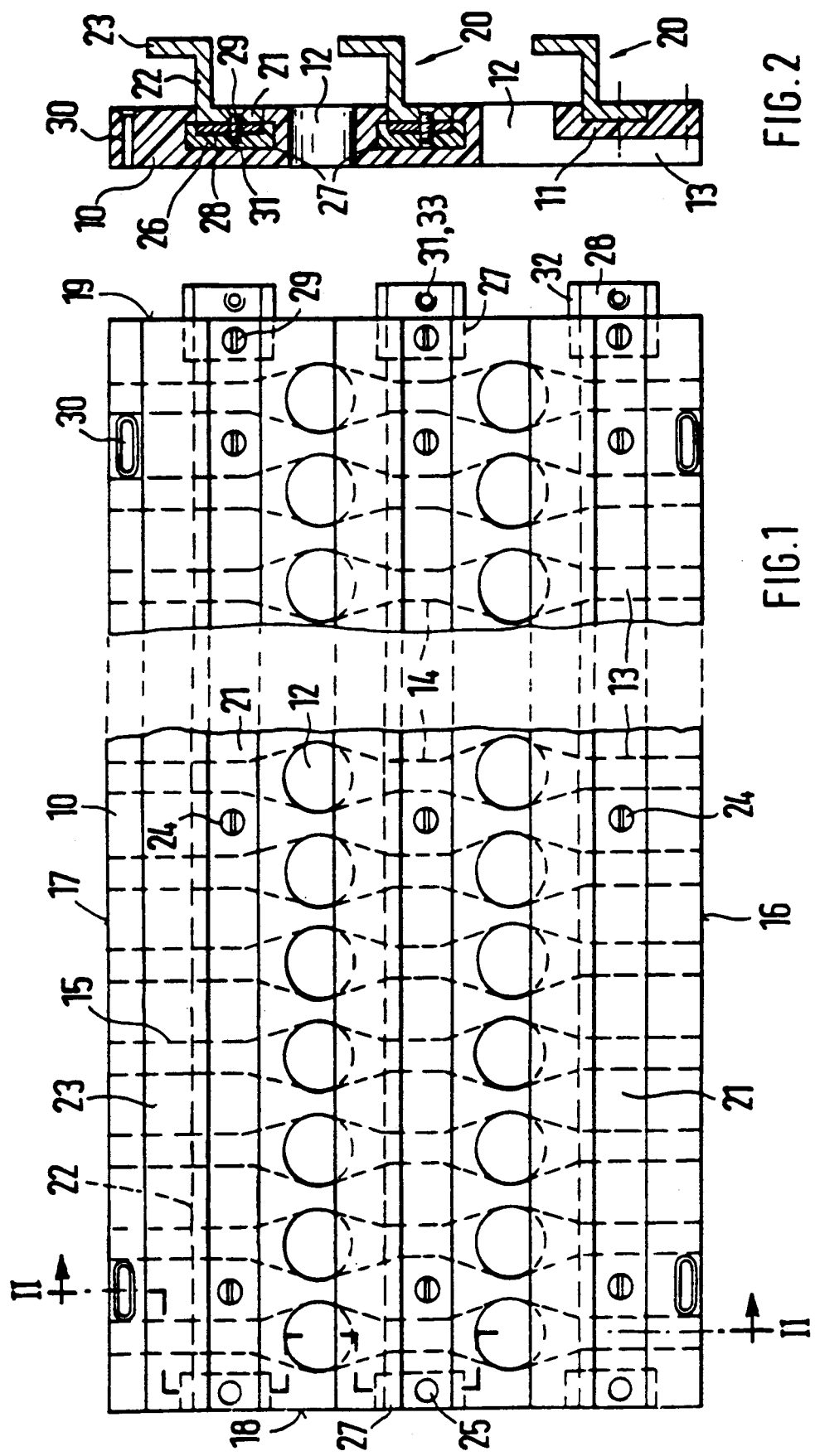

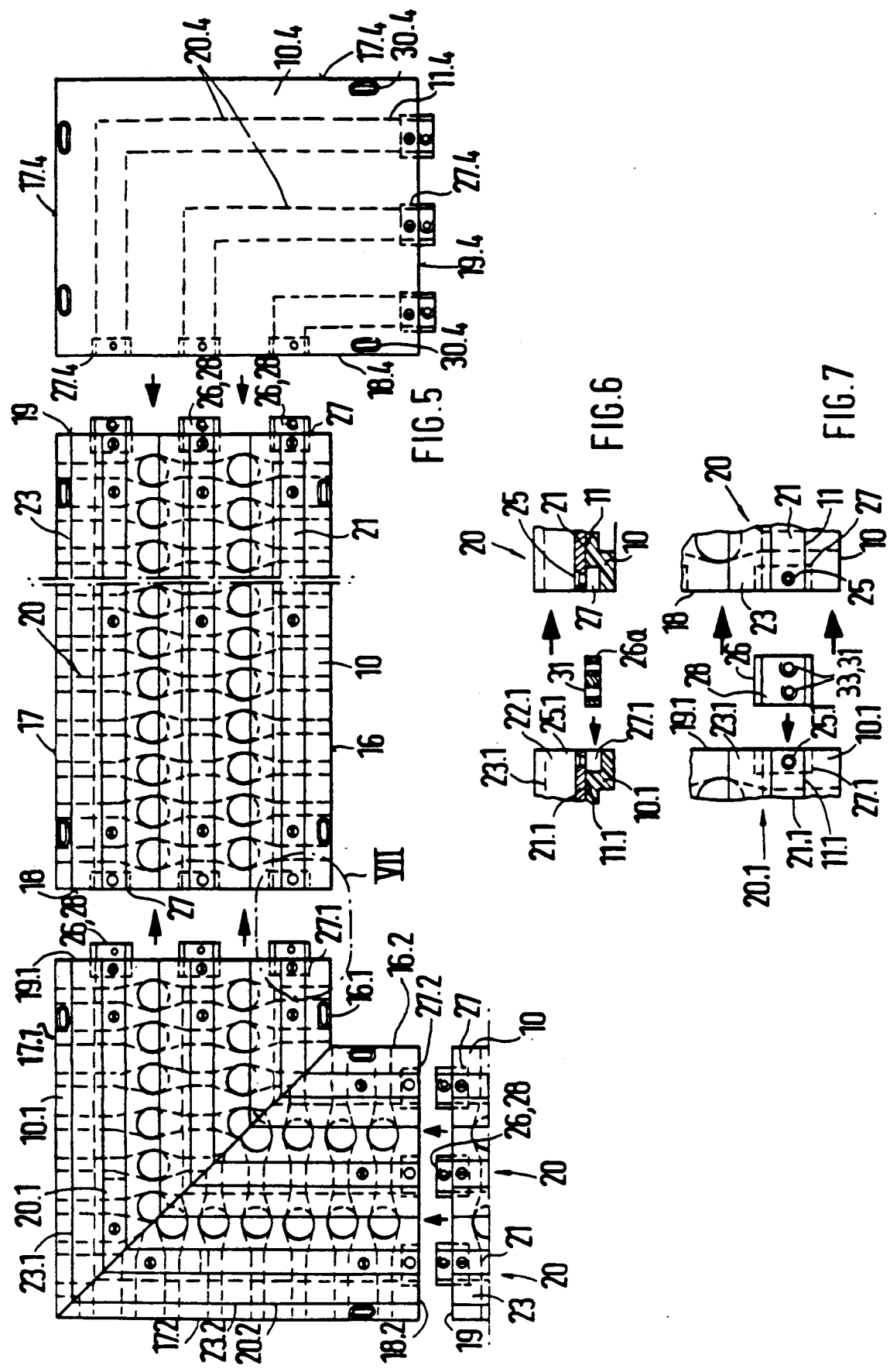

ASSEMBLY KIT FOR A BUSBAR SYSTEM

The invention concerns an assembly kit for a busbar system made of holders and of busbar sections that can be fixed in position or are fixed in position in receptacles of the holders, which receptacles are spaced from each other and run parallel to one another.

The known assembly kits for a busbar system consist of narrow, cuboid holders, such as those disclosed in German Patent No. 31 43 518 corresponding U.S. Pat. No. 4,457,481), and busbar sections of rectangular cross section that are inserted in slot-shaped receptacles of the holders arranged at a distance from one another and held therein by means of a cover. These assembly kits of the prior art have the disadvantage that the busbar system is very difficult to expand and can only be expanded in the longitudinal direction of the busbar sections. In addition, electrical equipment cannot be connected to the busbar sections in the area of the holders and connection points between adjacent busbar sections. Also, the busbar sections are not covered on the side facing the mounting surface between the holders.

It is the object of the invention to provide an assembly kit for a busbar system of the type described above the parts of said kit making possible an arbitrary expansion of the busbar system in directions perpendicular to one another in a simple manner while still insulating and covering the busbar sections of the entire busbar system on the side facing the mounting surface.

The invention achieves this object by means of an assembly kit consisting of the following units:

(a) a first type of holder composed of a rectangular carrier plate with its longitudinal dimension aligned in the longitudinal direction of busbar sections which are sections fixed in position in receptacles in its top and which terminate flush with its narrow sides;

(b) a second type of holder consisting of a right-angled carrier plate in which right-angled busbar sections are fixed in position in receptacles thereof that terminate flush with the end faces thereof, said end faces being located perpendicularly to the busbar sections; and (c) connecting elements with which abutting ends of busbar sections can be connected to one another so as to conduct electrically in the area of the joints of the carrier plates constituting the holders of the first type and/or of the second type connected in a row.

Using these easily prefabricated holders, a busbar system of any shape desired can be constructed in the two directions perpendicular to one another. The carrier plates constituting the holders and which are connected to the mounting surface need be connected in the area of the joints only by means of the connecting elements that provide electrical connection for the abutting busbar sections. The busbar sections are, regardless of their path, always insulated and covered on the side facing the mounting surface over their entire lengths by the carrier plates made of insulating material, a condition that noticeably reduces the possibility of short circuits in the busbar system.

So that busbar sections having identical cross section can be used in the entire busbar system and so that electrical equipment designed for this system may be connected at any point in the busbar system, the design is such that the receptacles in the carrier plates constituting the holders of the first type and of the second type are located at regular intervals with respect to one another and are designed with an identical cross section. The connection of electrical equipment such as that shown in German Patent No. 36 42 517 (corresponding U.S. Pat. No. 4,874,321) and German Patent No. 36 42 518 (corresponding U.S. Pat. No. 4,832,626) at any point of the joined busbar system is made possible in that the busbar sections are designed with a Z-shaped cross section of which one cross arm serves as a mounting arm that is inserted into the receptacle and is connected, preferably screwed, to the carrier plate, and of which the center arm, which serves as a spacer arm, holds the other cross arm, which serves as a clamping arm, at a distance from and parallel to the top of the carrier plate. In this respect, the alignment is such that the cross arms of the Z-shaped busbar sections on the carrier plates acting as clamping arms are each aligned toward the same longitudinal side e.g., the outside, of the carrier plates.

The construction of the right-angled holder of the second type is, according to one design, composed of two partial carrier plates that, in the area of their joints, are at a complementary angle of 45 degrees with respect to the busbar sections fixed in position on their taps. In this respect, it can be provided that right-angled one-piece busbar sections are inserted into the joined receptacles of the joined partial carrier plates constituting the holders of the second type or that individual busbar sections are inserted into the joined receptacles of the joined partial carrier plates constituting the holders of the second type, said individual busbar sections being joined to one another so as to conduct electrically in the area of the abutting, beveled sides of the partial carrier plates by means of right-angled connector elements.

The right-angled holder of the second type can, according to another design, be a one-piece carrier plate, individual busbar sections being inserted into the right-angled receptacles, said busbar sections being connected to one another so as to conduct electrically in the area of the right angles of the receptacles by means of right-angled connecting elements.

The connection of interconnecting cables to the joined busbar system is made possible in that a connecting plate is provided as an additional component, said plate being provided with right-angled connecting rails which terminate flush with the two connecting sides of the connecting plate which run at right angles to one another; and the connecting rails, at least on one connecting side of the connecting plate, can be connected to the busbar sections of the holder of the first type or of the second type by means of connecting elements.

Abutting busbar sections are electrically connected in the area of the joints of the carrier plates according to one design by providing recesses which accommodate one-half of plate-shaped connecting elements in the slot bottoms of the slot-shaped receptacles of the carrier plates in the end sections of the narrow sides or of the end faces; and by providing the busbar sections in the area of these recesses with mounting holes for mounting screws that can be screwed into threaded holes of the connecting elements inserted in the recesses. In this respect, the design is such that the recesses are located in the slot bottoms of the slot-shaped receptacles and the width, depth and height of these recesses are matched to the width, one-half the length and the thickness of the plate-shaped connecting elements. A sufficiently large contact surface and thus a low contact resistance is achieved in this respect in that the width of the connector elements corresponds to the width of the recesses and the width of the mounting arms of the busbar sections.

However, the connection may also have connecting elements that are composed of an insulating plate and a contact plate, the mounting screws being screwed through holes of the contact plate into threaded holes of the insulating plate.

Protected routing of the connecting cables and interconnecting cables to the electrical equipment mounted on the busbar sections is, in one design, provided in that, at least between the adjacent busbar sections, rows of openings are located in the carrier plate, said openings being aligned at regular intervals in the longitudinal direction of said plate and one above the other perpendicular to said direction; and that ducts running perpendicular to the busbar sections are provided in the bottom of the carrier plate, said ducts, functioning as cable ducts, connecting the openings to one another and to the longitudinal sides, i.e., the outer sides and inner sides, of the carrier plate.

Connecting the connecting plate to the busbar system is facilitated in that the connecting rails are made of flat material and are inserted into corresponding slot-shaped receptacles of the connecting plate and that recesses of the receptacles for inserting connecting elements are provided in the area of the ends of the connecting rails at the connecting sides of the connecting plate.

The invention is explained in more detail on the basis of implementation examples shown in the following drawings:

FIG. 1 is a plan view of a straight holder of the first type with busbar sections inserted.

FIG. 2 is a cross-section through the holder of the first type along line II—II of FIG. 1.

FIG. 5 is a schematic plan view of the composition of a busbar system with holders of the first type and the second type as well as a connection plate.

FIG. 6 is a in cross-sectional view of the electrical connection by means of a one-piece connecting element.

FIG. 7 is a the plan view of a partial area VII of FIG. 5 in which the connection by means of a two-piece connecting element can be seen.

Figure 3:
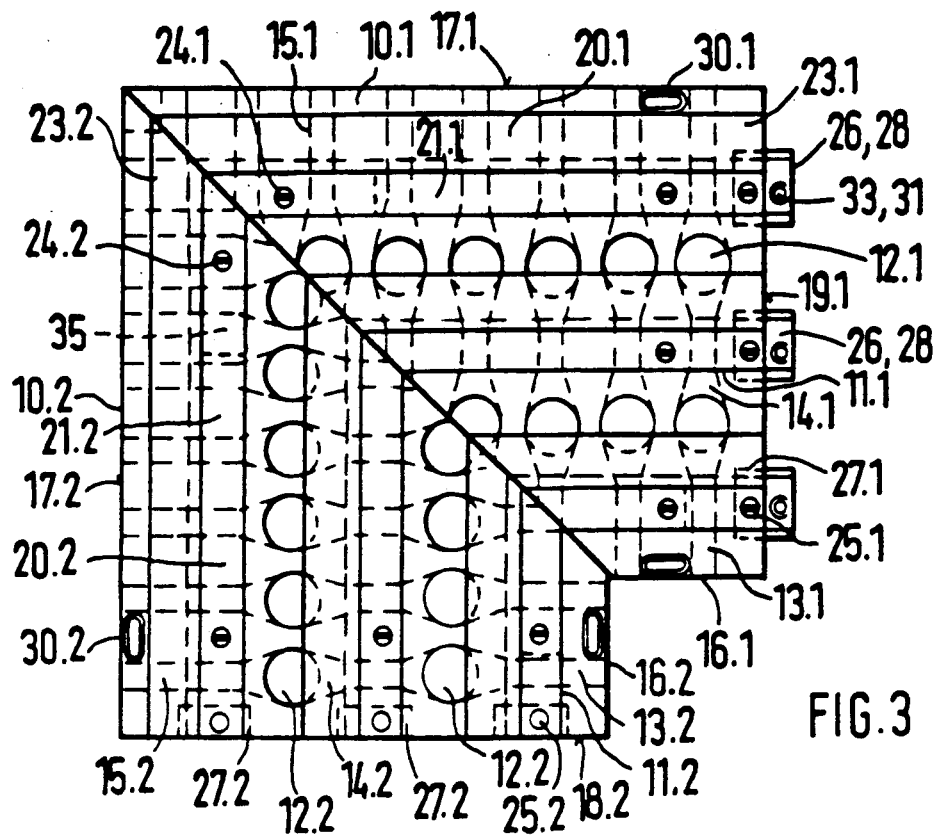
FIG. 3 is a plan view of an initial implementation example for a right-angled holder of the second type.

FIGS. 1 and 2 show an implementation example for a straight holder of the first type consisting of the rectangular carrier plate 10 made of insulating material and the busbar sections 20 inserted into the receptacles 11 on the top of the carrier plate 10. The receptacles 11 are located perpendicularly to the busbar sections 20 at regular intervals. The busbar sections 20 have a Z-shaped cross section, the one cross arm 21, as the mounting arm, being inserted flush into the receptacle 11 and fixed in position in said receptacle by means of the screws 24. The screws 24 are also arranged at regular intervals in the longitudinal direction of the busbar sections 20 and positioned one above the other perpendicularly to this direction. The center arms of the busbar sections 20 are used as spacer arms 22 that hold the other cross arms 23 of the busbar sections 20, functioning as clamping arms, to fix the electrical equipment into position at a specified distance and parallel to the top of the carrier plate 10. The busbar sections 20 extend over the entire length of the carrier plate 10, run parallel to the longitudinal sides 16 and 17 of said carrier plate and terminate flush with the narrow sides 18 and 19 of the carrier plate 10 that run perpendicularly to the busbar sections 20. The carrier plate 10 isolates and covers the busbar sections 20 completely on the side facing the mounting surface. Ducts 13, 14 and 15 running perpendicularly to the sides 16 and 17 are located in the bottom of the carrier plate 10, said ducts extending over a portion of the thickness of the carrier plate 10. Between adjacent busbar sections 20, rows of openings 12, designed as holes, are located in the carrier plate 10. The openings 12 are positioned in the longitudinal direction of the busbar sections 20 at regular intervals and, in the rows, the openings 12 are aligned perpendicularly to the busbar sections 20 one above the other. The ducts 13 connect the longitudinal side 16 with the facing row of openings 12, while the ducts 15 connect the longitudinal side 17 with that facing row of openings 12. The ducts 14 connect the openings 12 of both rows. In this manner, ducts 13, 14 and 15 serve as cable ducts in which connecting cables and interconnecting cables can be routed in the specified arrangement of openings 12 in the rows protected by the carrier plate 10 to the electrical equipment fixed in position on the clamping arms 23 of the busbar sections 20. In the edge area of the longitudinal sides 16 and 17, the carrier plate 10 has mounting holes 30 for mounting screws.

The holder of the first type, i.e., the carrier plate 10, and the busbar sections 20 inserted into the receptacles 11 forms a prefabricated unit. A number of these holders of the first type can be connected to one another in a row to form a busbar system. In so doing, the abutting ends of the busbar sections 20 must be connected to one another so as to conduct electrically. In this respect, busbar sections 20 of the same cross sections are used in holders of this first type. If the clamping arms 23 of all busbar sections 20 face the longitudinal side 17 of the carrier plate 10, the clamping arms 23 then have the same average spacing as the receptacles 11 in the carrier plate 10 which is matched to the contact bridges or spring contacts of the mounted electrical equipment.

Recesses 27 are located in the slot bottoms of the slot-shaped receptacles 11 in the narrow sides 18 and 19 of the end sections facing the carrier plate 10; said recesses accommodate one-half of a one-piece plate-shaped connecting element 26a (FIG. 6) or one-half of a two-piece connecting element made of an insulating plate 26 and a conducting plate 28. The width, depth and height of these recesses 27 correspond, in the case of the one-piece, electrically conducting connecting element 26a, to the width, one-half the length and the thickness of the connecting element 26a. Over the recesses 27, the busbar sections 20 having mounting holes 25 for the mounting screws 29 that are screwed into threaded holes 31 of the connecting elements 26a. In this manner, the carrier plates 10 constituting the holders of the first type connected in a row can connect to each other without joints, and the connecting elements 26a connect the busbar sections 20 so as to conduct electrically beneath the mounting arms 21. In so doing, the complete width of the mounting arms 21 is utlized at the contact surface if the recesses 27 and connecting elements 26a extend over the entire width of the mounting arms 21 of the busbar sections 20.

As the plan views of FIGS. 1 and 7 show, connection can also be made by means of two-part connecting elements. The electrically conducting contact plates 28 extend over the entire width of the mounting arms 21 of the busbar sections 20 while the side arms 32 of the insulating plate 26, which has a U-shaped cross section, cover in an insulating manner the longitudinal sides of the contact plates 28. The recesses 27 thus have a width that is greater than the width of the mounting arms 21 of the busbar sections 20 and corresponds to the width of the insulating plates 26. The contact plates 28 have through-holes 33 for the mounting screws 29 over the threaded holes 31 of the insulating plates 26, said screws again being inserted into the mounting holes 25 of the busbar sections 20.

FIG. 3 shows a right-angled holder of the second type that, connected to the holder of the first type, can route the busbar system downward or upward in a direction perpendicular to the busbar sections 20 of the holder of the first type. This depends merely on which end face 18.2 or 19.1 of the right-angled carrier plate is used as the connecting side and which narrow side 18 or 19 of the carrier plates 10 constituting the holder of the first type is connected in a row.

In the implementation example of FIG. 3, two partial carrier plates 10.1 and 10.2 are used as the carrier plate, said partial plates abutting at an angle of 45 degrees and complementing each other to form a right angle. In this respect, individual busbar sections 20.1 and 20.2 may be inserted into the receptacles 11.1 and 11.2 of the partial carrier plates 10.1 and 10.2, said sections abutting at the joint of the partial carrier plates 10.1 and 10.2 at an angle of 45 degrees and being connected to one another in this corner area by means of right-angled connecting elements 35 that conduct electrically. The connecting elements 35 are, in this respect, preferably embedded in the slot bottoms of the slot-shaped abutting receptacles 11.1 and 11.2. The busbar sections 20.1 and 20.2 again have mounting arms 21.1 and 21.2, spacer arms as well as clamping arms 23.1 and 23.2 that face the outer sides 17.1 and 17.2 of the right-angled carrier plate constituting the holder of the second type made of the partial carrier plates 10.1 and 10.2. The inner sides 16.1 and 16.2 are connected to the facing openings 12.1 and 12.2 by way of the ducts 13.1 and 13.2 while the ducts 15.1 and 15.2 connect the other row of openings 12.1 and 12.2 to the outer sides 17.1 and 17.2. The ducts 14.1 and 14.2 connect the rows of openings 12.1 and 12.2 to one another. In the end faces 18.2 and 19.1 of the partial carrier plates 10.1 and 10.2, the receptacles 11.1 and 11.2 are provided with recesses 27.1 and 27.2 which can again accommodate one-half of the one-piece connecting elements 26a or two-piece connecting elements 26, 28. The mounting holes 25.1 and 25.2 in the busbar sections 20.1 and 20.2 are again used to accommodate mounting screws 29; and the partial carrier plates 10.1 and 10.2 can be connected to the mounting surface by way of the mounting holes 30.1 and 30.2. The busbar sections 20.1 and 20.2 are connected to the partial carrier plates 10.1 and 10.2 by means of the screws 24.1 and 24.2.

Figure 4:
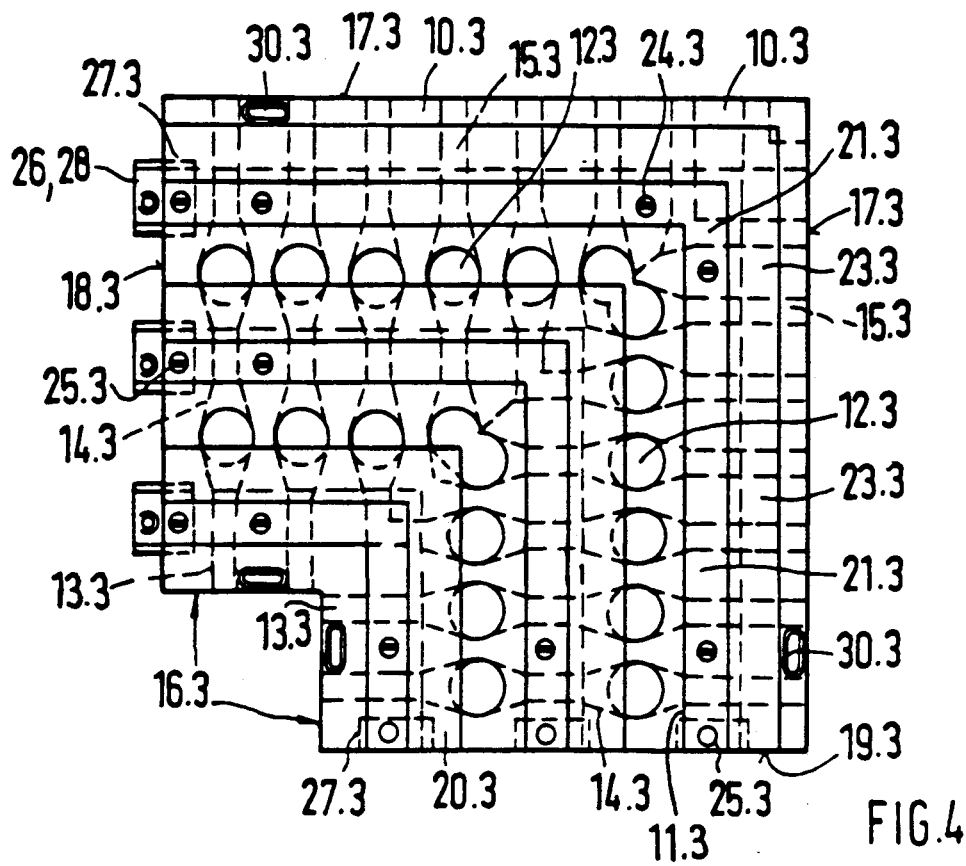
FIG. 4 is a plan view of a second implementation example for a right-angled holder of the second type.

The right-angled carrier plate of the holder of the second type composed of partial carrier plates 10.1 and 10.2 can also accommodate one-piece right-angled busbar sections, the individual busbar sections 20.1 and 20.2 being joined. Also, the partial carrier plates 10.1 and 10.2 may be produced as a one-piece right-angled carrier plate 10.3 as shown in the implementation example of FIG. 4. The end faces 18.3 and 19.3 of the right-angled carrier plate 10.3 serve as connecting sides, the receptacles 11.3 being provided with the recesses 27.3 located in the slot bottoms to accommodate a one-piece connecting element 26a or a two-piece connecting element made of the insulating plate 26 and the contact plate 28. The busbar sections 20.3 are right-angled and terminate flush with the end faces 18.3 and 19.3 of the carrier plate 10.3. The mounting arms 21.3 of the busbar sections 20.3 are inserted flush into the receptacles 11.3 and these sections are connected in the carrier plate 10.3 by means of the screws 24.3. The ducts 13.3, 14.3 and 15.3 in the bottom of the carrier plate 10.3 serve as cable ducts running perpendicularly to the busbar sections 20.3. and communicating with the openings 12.3. The clamping arms 23.3 stand off from the top of the carrier plate 10.3 by means of spacer arms and all face the outer sides 17.3 of the carrier plate 10.3 so that additional holders of the first type or second type may be connected in a row on both end faces 18.3 and 19.3. Above the recesses 27.3 of the receptacles 11.3, the busbar sections 20.3 bear the mounting holes 25.3 for the mounting screws that connect the connecting elements 26a or 26, 28 to the busbar sections 20.3. In the area of the inner sides 16.3 and outer sides 17.3, the carrier plate 10.3 has mounting holes 30.3 for mounting the holes of the second type to the mounting surfaces.

FIG. 5 indicates how a holder of the second type according to FIG. 3 can be connected in a row to a holder of the first type according to FIG. 1 on the narrow side 18. The end face 19.1 of the holder of the second type faces the narrow side 18 of the first type holder. The connecting elements 26, 28 are inserted into the recesses 27 and 27.1 and connected to the busbar sections 20 and 20.1 by means of mounting screws. An additional holder of the first type can be connected to the end face 18.2. In this manner, the busbar system is routed perpendicularly downward from the horizontal direction. The clamping arms 23, 23.1 and 23.2 face the longitudinal side 17 and the outer sides 17.1 and 17.2 so that electrical equipment may be connected both in the horizontal and in the vertical sections of the busbar system.

If the end face 18.2 of the holder of the second type is connected to the narrow side 18 of the holder of the first type, the busbar system is routed vertically upward by way of the holder of the second type.

As shown on the right of FIG. 5, the power supply cables are connected to the busbar system by way of the connecting plate 10.4. The right angle connecting rails 20.4 are fastened on the connecting plate 10.4 in the receptacles 11.4 that end in the recesses 27.4 on the connecting side 19.4. The recesses 27.4 accommodate connecting elements 26, 28 to which the power supply cables may be connected. On the side 18.4 perpendicular to this, the receptacles 11.4 also end in recesses 27.4 for the accommodation of connecting elements 26, 28 by way of which a holder of the first type or of the second type can be connected in a row.

Power supply cables can, however, also be connected directly to the connecting elements 26, 28 inserted in the recess 27 of a holder of the first type or in the recesses 27.1, 27.2 or 27.3 of a holder of a second type by omitting the connecting plate 10.4. Mounting holes 30.4 are located in the area of the connecting side 18.4 and the outer side 17.4 of the connecting plate 10.4, said holes accommodating the mounting screws for attaching the connecting plate 10.4 to the mounting surface. Even the connecting rails 20.4 are completely insulated and covered on the side facing the mounting surface.

A busbar system can be expanded in two directions perpendicular to one another with holders of the first type and the second type. Holders of the first type and of the second type can be prefabricated as units and/or connected together in rows to form the busbar system by means of connecting elements 26, 28 or 26a in the manner desired, the connecting elements 26, 28 or 26a making the electrical connections of the busbar sections with uniform cross sections arranged at regular intervals to one another.

I claim:

1. An assembly kit for a busbar system made of holders and of busbar sections which can be fixed in position in receptacles of the holders, which receptacles are parallel to one another and are spaced from one another, comprising:

a. a first type of holder composed of a rectangular carrier plate having long sides and narrow sides with its longitudinal dimension aligned in the longitudinal direction of busbar sections which are fixed in position in reptacles its top and which receptacles terminate flush with its narrow sides, b. a second type of holder consisting of a right-angle carrier plate in which right-angled busbar sections are fixed in position in receptacles in the top thereof that terminate flush with the end faces thereof, said end faces being located perpendicularly to the busbar sections, c. connecting elements with which busbar ends of busbar sections can be connected to one another so as to connect electrically in the area of the joints of the carrier plates constituting holders of the first type and/or of the second type connected together in a row, d. wherein the receptacles in the carrier plates constituting the holders of the first type and of the second type are arranged at uniform intervals with respect to one another and are identical in cross section and wherein the busbar sections have a Z-shaped cross section, a cross arm being inserted into each receptacle as a mounting arm and connecting to the respective carrier plate, one spacer arm holding the corresponding other cross arm as a clamping arm at a distance from and parallel to the top of the respective carrier plate, and wherein the cross arms of Z-shaped busbar sections acting as the clamping arms on the carrier plates are all aligned to the same longitudinal side of the carrier plate.

2. An assembly kit for a busbar system according to claim 1 wherein the right-angled carrier plate of the holder of the second type is composed of two joined partial carrier plates that, in the area where they are joined, are provided with complementary angles of 45 degrees in each case to the busbar sections fixed in position on their tops.

3. An assembly kit for a busbar system according to claim 2 wherein the right-angled busbar sections are one-piece busbar sections that are inserted in the joined right-angled receptacles of the joined partial carrier plates of the holder of the second type.

4. An assembly kit for a busbar system according to claim 2 wherein the right-angled busbar sections are two-piece busbar sections that are inserted in the joined right-angled receptacles of the joined partial carrier plates of the holder of the second type, said two-piece sections being connected to one another so as to conduct electrically by means of right-angled connecting elements.

5. An assembly kit for a busbar system according to claim 1 wherein the right-angled carrier plate of the second type of holder is designed as a single piece; and right-angled one-piece busbar sections are inserted into the right-angled receptacles thereof.

6. An assembly kit for a busbar system according to claim 1 wherein the right-angled carrier plate of the holder of the second type is designated to be a single piece; and two-piece busbar sections are inserted into the right-angled receptacles thereof, said two-piece sections being connected to one another so as to conduct electrically by means of right-angled connecting elements.

7. An assemgly kit for a busbar system according to claim 1 wherein a connecting plate is provided as an additional component, said plate being equipped with right-angled connecting rails;

the right-angled connecting rails terminate flush with two connecting sides of the connecting plate that are at right angles to one another; and the connecting rails can be connected, at least on one connecting side of the connecting plate to the buscar sections of a holder of the first type or of the second type by means of connecting elements.

8. An assembly kit for a busbar system according to claim 7 wherein the right-angled connecting rails are made of flat material and are inserted into corresponding slot-shaped receptacles in the connecting plate; and recesses are provided in the slot-shaped receptacles for inserting connecting elements in the area of the ends of the right-angled connecting rails on the connecting sides of the connecting plate.

9. An assembly kit for a busbar system according to claim 1 wherein recesses to accommodate one-half of the connecting elements are located in the bottoms of the receptacles of the carrier plates in the end sections of the narrow sides; and the busbar sections are provided with mounting holes for mounting screws in the area of these recesses, said screws capable of being screwed into threaded holes of the connecting elements inserted into the recesses.

10. An assembly kit for a busbar system according to claim 9 wherein the width, depth and height of said recesses are matched to the width, one-half of the length and the thickness of the connecting elements.

11. An assembly kit for a busbar system according to claim 10 wherein the width of the connecting elements is greater than the width of the mounting arms of the busbar sections.

12. An assembly kit for a busbar system according to any one of claims 1, 10 and 11 wherein the connecting elements are composed of an insulating plate and a contact plate, and mounting screws are screwed through holes in the contact plate into threaded holes of the insulating plate.

13. An assembly kit for a busbar system according to any one of claims 1, 10 and 11 wherein rows of openings are located in each carrier plate at least between adjacent busbar sections, said openings being located at regular intervals along the longitudinal direction of each carrier plate and one above the other perpendicular to said direction; ducts running perpendicular to the busbar sections are located in the bottom of each carrier plate, said ducts acting as cable ducts and connecting the openings to one another and to the longitudinal sides of the carrier plates.

* * * * *